United States Patent
Gupta et al.

(10) Patent No.: US 7,901,189 B2
(45) Date of Patent: Mar. 8, 2011

(54) WIND-TURBINE BLADE AND METHOD FOR REDUCING NOISE IN WIND TURBINE

(75) Inventors: Anurag Gupta, Clifton Park, NY (US); Thierry Maeder, Munich (DE)

(73) Assignee: General Electric Company, Schenectady, NY (US)

( * ) Notice: Subject to any disclaimer, the term of this patent is extended or adjusted under 35 U.S.C. 154(b) by 914 days.

(21) Appl. No.: 11/798,377

(22) Filed: May 14, 2007

(65) Prior Publication Data
US 2008/0286110 A1    Nov. 20, 2008

(51) Int. Cl.
*F01D 5/14*    (2006.01)
(52) U.S. Cl. .......................... 416/230; 416/500
(58) Field of Classification Search ............... 415/4.3, 415/4.5, 908; 416/230, 232, 233, 500
See application file for complete search history.

(56) References Cited

U.S. PATENT DOCUMENTS

| | | |
|---|---|---|
| 3,779,338 A | 12/1973 | Hayden et al. |
| 4,089,618 A | 5/1978 | Patel |
| 4,140,433 A | 2/1979 | Eckel |
| 4,339,230 A | 7/1982 | Hill |
| 4,534,526 A | 8/1985 | Metzger et al. |
| 4,976,587 A | 12/1990 | Johnston et al. |
| 5,074,376 A | 12/1991 | Powell |
| 5,257,902 A | 11/1993 | Atarashi et al. |
| 5,403,161 A | 4/1995 | Nealon et al. |
| 5,437,419 A | 8/1995 | Schmitz |
| 5,478,029 A | 12/1995 | Schmitz |
| 5,634,771 A | 6/1997 | Howard et al. |
| 5,720,597 A | 2/1998 | Wang et al. |
| 5,791,879 A | 8/1998 | Fitzgerald et al. |
| 5,823,467 A | 10/1998 | Mathur |
| 5,839,882 A | 11/1998 | Finn et al. |
| 5,931,641 A | 8/1999 | Finn et al. |
| 6,139,278 A | 10/2000 | Mowbray et al. |
| 6,358,013 B1 | 3/2002 | Rose et al. |
| 6,443,700 B1 | 9/2002 | Grylls et al. |
| 6,470,568 B2 | 10/2002 | Fried et al. |
| 6,514,046 B1 | 2/2003 | Morrison et al. |
| 6,582,812 B1 | 6/2003 | Grylls et al. |

FOREIGN PATENT DOCUMENTS

| | | | |
|---|---|---|---|
| GB | 2254382 A | * | 10/1992 |
| WO | WO 01/98653 | | 12/2001 |

* cited by examiner

*Primary Examiner* — Edward Look
*Assistant Examiner* — Dwayne J White
(74) *Attorney, Agent, or Firm* — Nixon & Vanderhye PC

(57) ABSTRACT

Low-noise wind turbine blades are provided wherein metallic and/or polymeric cellular materials that are capable of bearing directional loads are used in the construction of wind turbine blade parts or entire sections. The use of such materials influences the air flow over them in such a way that the resulting boundary-layer turbulence is damped in a controlled way, thus weakening the noise scattering mechanism at the trailing edge, and the scattered acoustic waves are absorbed and attenuated by the material acting as an acoustic liner.

22 Claims, 3 Drawing Sheets

Air (blowing or suction)

US 7,901,189 B2

WIND-TURBINE BLADE AND METHOD FOR REDUCING NOISE IN WIND TURBINE

BACKGROUND OF THE INVENTION

The aerodynamic part of wind turbine noise is a CTQ (critical to quality) of growing significance. It is gaining importance from a competitive and regulatory perspective as the market is driving product design to larger turbines with higher blade tip speed. Here, aerodynamic noise becomes a crucial constraint on efficiency and yield of a design. As such, there is a need for concepts for noise reduction.

The present invention defines a concept wherein materials technology is used as a means of noise reduction, targeting blade self-noise and tip-noise, the two primary components of wind turbine aerodynamic noise. In the past, aerodynamic shaping has been the primary means of achieving lower noise levels, e.g., the use of large chord, higher solidity blades, low-noise airfoil design, plan-form and tip/winglets geometry. Noise reduction concepts that use add-ons like trailing edge serrations, sharp trailing edge inserts and the like have also been investigated and, in some cases put into production.

BRIEF DESCRIPTION OF THE INVENTION

The invention proposes to incorporate cellular material in wind-turbine blades to reduce noise, via noise source reduction and/or noise attenuation and absorption.

The invention may be embodied in a wind turbine blade having a pressure side and a suction side, a leading edge, a trailing edge and a tip region, at least a portion of said blade being formed from a cellular material, said cellular material portion defining a portion of an exposed surface of said blade, whereby aerodynamic noise is reduced via noise source reduction and/or noise attenuation and absorption by the cellular material.

The invention may also be embodied in a method of reducing noise in a wind turbine via at least one of noise source reduction and noise attenuation and absorption by a wind turbine blade, the method comprising: providing a wind turbine blade for the wind turbine, said blade having a pressure side and a suction side, a leading edge, a trailing edge and a tip region; wherein at least a portion of said blade is formed from a cellular material and wherein said cellular material portion defines a portion of an exposed surface of the blade.

DETAILED DESCRIPTION OF THE INVENTION

As noted above, the invention proposes to incorporate cellular material in wind-turbine blades to reduce noise, via noise source reduction and/or noise attenuation and absorption.

More specifically, in regard to noise source reduction, the use of cellular materials as proposed in example embodiments of the invention, for example on the aft end of a blade structure, impacts the boundary layer flow on the blade and the related turbulence activity. By controlling the resistance offered to the flow, via porosity and/or other surface characteristics that affect the turbulent eddies in the boundary layer, the turbulence noise sources can be modified to yield lower noise or shift the spectra to frequencies that are more amenable to attenuation. In regions of vortical flows, e.g., the tip region, the structure can be made entirely of cellular materials, whose characteristics would be tailored to reduce the size and strength of the tip vortex that forms the primary source of tip noise. Thus, in a sense, cellular materials act similarly to porous surface treatments that have been shown to reduce aerodynamic noise sources in other applications.

In regard to noise attenuation and absorption, the cellular material itself can serve the purpose of attenuating and absorbing the noise being generated or transmitted in the turbulent boundary layer. Metallic or polymeric (or other type, e.g. Carbon) foam characteristics like porosity and depth can be varied so that the structure of the blade itself becomes an acoustic liner and does not need any special inserts to absorb aerodynamic noise.

Open-cell material is preferred in the tip region to allow for a suitable pressure balance between pressure and suctions sides. In the trailing-edge region, an appropriate mix of open and closed-cell material is proposed, in an example embodiment, to attain the aerodynamic and aeroacoustic characteristics described above.

In example embodiments of the invention, cellular materials that can provide structural integrity in the wind turbine blade applications are used in targeted sections with their surface characteristics tailored to provide aero acoustic advantages. Both noise source reduction and acoustic attenuation mechanisms are exploited to create low-noise wind turbine blades that will enable higher tip-speeds for wind turbines, and hence better efficiency and yield.

More specifically, in example embodiments of the invention, aerodynamic shapes are created out of cellular materials to make the aerodynamic structure itself a noise reduction method rather than requiring the use of additional devices, inserts or liners on a base blade structure.

Figure 1:
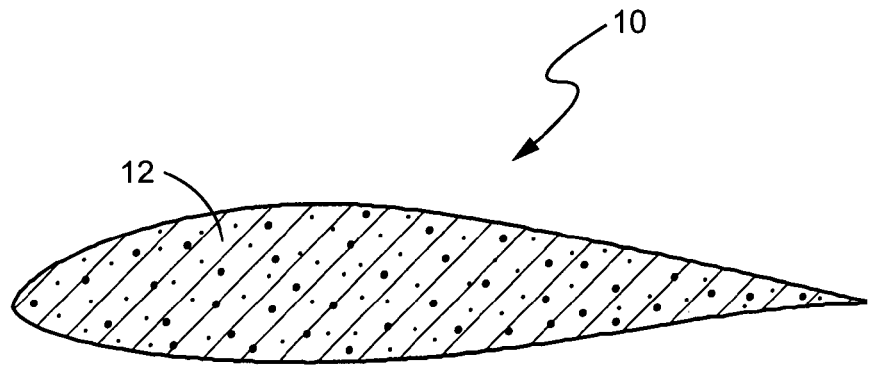
FIG. 1 is a schematic cross-sectional view (airfoil) of a wind-turbine blade wherein the full airfoil section comprises cellular material, according to an example embodiment of the invention.
Figure 2:
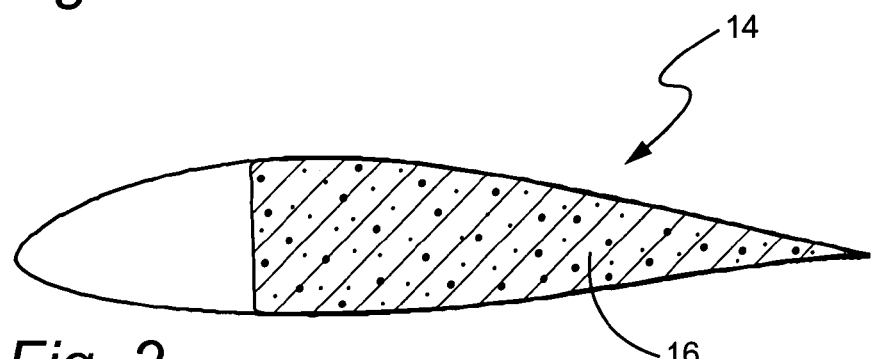
FIG. 2 is a schematic cross-sectional view (airfoil) of a wind-turbine blade wherein a partial airfoil section comprises cellular material, according to another example embodiment of the invention.
Figure 3:
FIG. 3 is a schematic cross-sectional view (airfoil) of a wind-turbine blade wherein a trailing-edge airfoil section comprises cellular material, according to another example embodiment of the invention.

Referring to the drawings, FIG. 1 is a schematic cross-sectional view of a wind turbine blade 10 according to an example embodiment of the invention. In this embodiment, the full airfoil section comprises a cellular material 12 so that the entire surface of the wind turbine blade has characteristics, according to the cellular material provided, tailored to provide aero acoustic advantages. By controlling the porosity and/or the surface characteristics of the exposed surface of the cellular material, the turbulence noise sources can be modified to yield lower noise or shift the spectra to frequencies that are more amenable to attenuation. Moreover, the cellular material itself serves the purpose of attenuating and absorbing the noise generated or transmitted in the turbulent boundary layer. According to another example embodiment, as schematically illustrated in FIG. 2, a partial airfoil section 14 comprises cellular material 16. As yet a further alternative, as illustrated in FIG. 3, an aft portion, for example, a trailing edge airfoil section 18 comprises cellular material 20.

As described above, FIGS. 1, 2 and 3 schematically illustrate cellular material integrated as a structural component; as a full airfoil section, especially near the tip. As an alternative, however, the cellular material can be provided only on the surface, with an appropriate thickness or as a combination of a structural component and a surface component where the structural part tapers into a surface part. Where a surface section or partial airfoil section is formed from cellular material, the foam material is attached to the remainder of the structure using any conventional fastening technique such as, for example, glue or connection with a mechanical component such as a screw. Other bonding techniques are known and could be used instead without departing from this invention.

Figure 4:
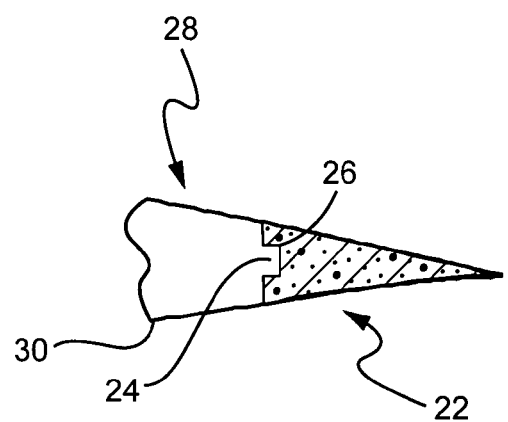
FIG. 4 is a schematic cross-sectional view showing an alternate example detail of the trailing-edge airfoil section of FIG. 3.
Figure 5:
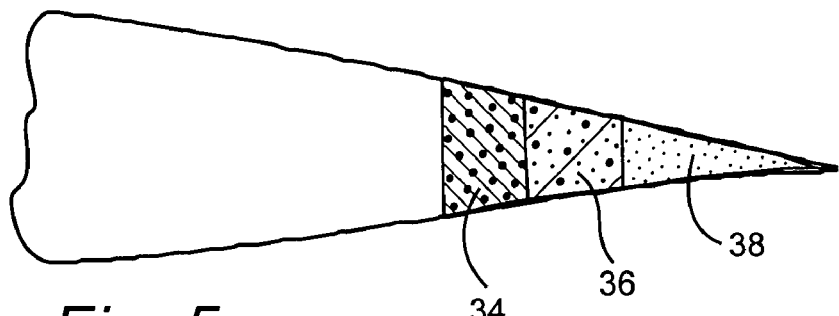
FIG. 5 is a schematic cross-sectional view showing another alternate example detail of the trailing-edge airfoil section of FIG. 3.

FIG. 4 schematically illustrates an example trailing edge section 22. In this example, complimentary coupling components in the form of a rib 24 and groove 26 are provided in or on the trailing edge section 22 (formed from cellular material in this example), and the trailing edge 28 of the balance of the blade 30 to facilitate alignment and coupling. The trailing edge section may be provided as comprising substantially homogeneous cellular material 20, as illustrated in FIG. 3. In the alternative, as illustrated in FIG. 5, functional grading is provided in the aft portion, with different cellular foams 34,36,38 for chordwise control of material properties. For example, the cellular materials may be of different porosity or may have open cells or closed cells, as deemed necessary or appropriate. As a further alternative, the cellular material may be varied in the spanwise direction.

Figure 6:
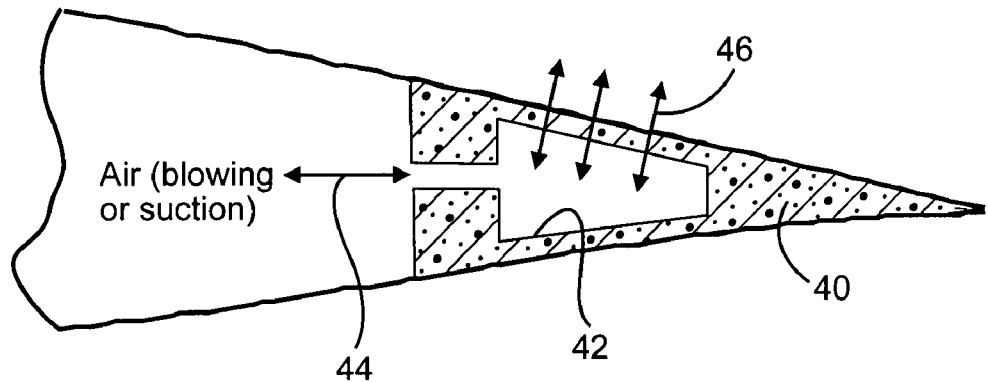
FIG. 6 is a schematic cross-sectional view showing yet another alternate example detail of the trailing-edge airfoil section of FIG. 3.

In yet a further example embodiment, the cellular foam 40 can have a plenum 42 defined therein or is connected to a pressurized plenum 42 internal to the structure that actively controls the blade's transpiration and hence its acoustic attenuation. Thus, as illustrated in FIG. 6, air can flow into or out of the plenum 42 by blowing or suction from the main body of the blade as at 44 while transpiration occurs from the plenum to the outer surface of the blade as illustrated by arrows 46. The provision of cellular material through which transpiration can occur provides an important flow control capability that can be used not just for noise reduction by modifying the boundary layers that give rise to blade self noise but also aerodynamic performance improvement (reduction of drag, delay of stall, improvement in lift).

Figure 7:
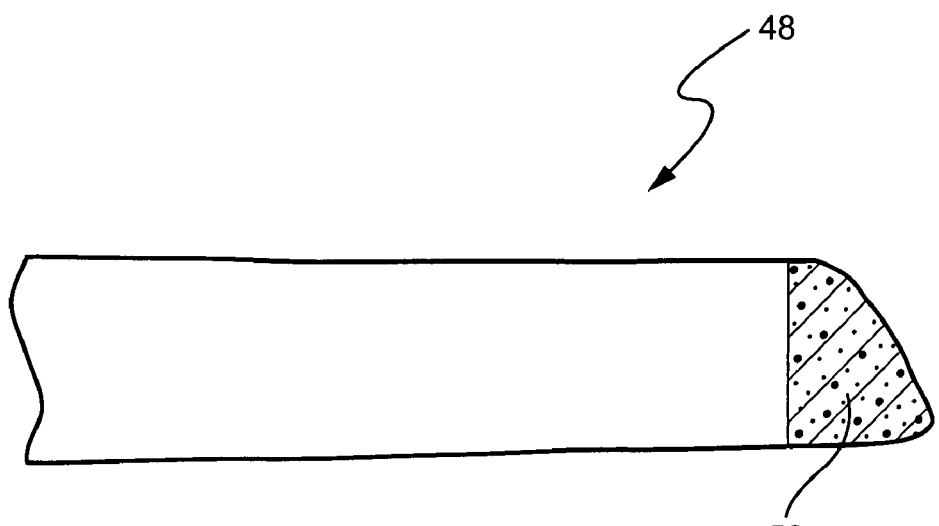
FIG. 7 is a schematic plan view of a wind-turbine blade having a blade outboard section made with cellular material according to a further example embodiment of the invention.
Figure 8:
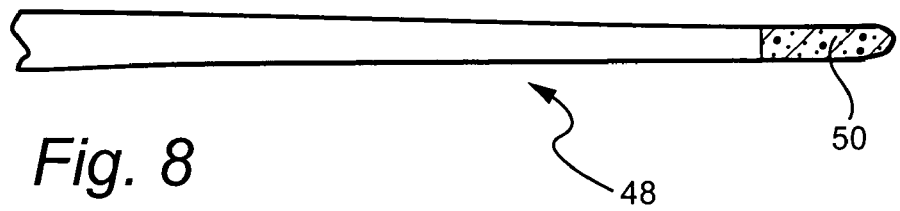
FIG. 8 is a schematic front view of the wind-turbine blade outboard section of FIG. 7.
Figure 9:
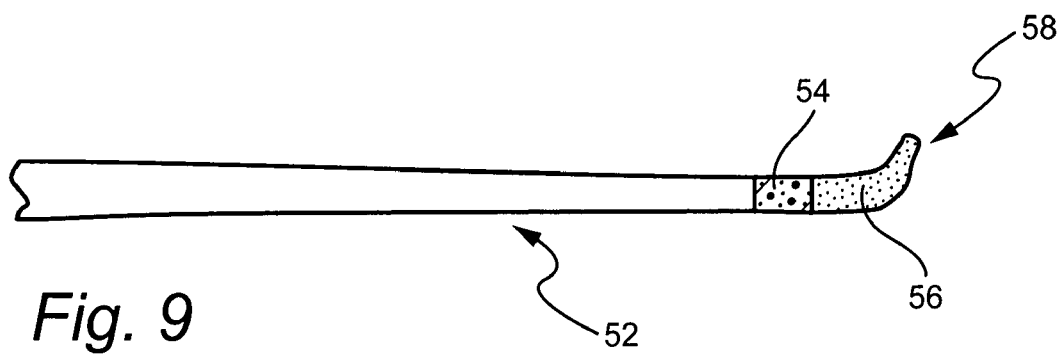
FIG. 9 is a schematic front view of another wind-turbine blade having a blade outboard section comprising cellular material.

Foams can also be used to create tip sections and winglet designs that are significantly more effective at altering tip vortex characteristics to reduce tip noise. Or, the benefits of using such materials for designing low-noise wing tips and/or winglets would be that such tips/winglets would be smaller and hence have a much smaller systems penalty (weight, aeroelastic phenomena such as flutter, tower clearance) than tips/winglets designed with conventional materials. Thus, as further example embodiments, FIGS. 7, 8 and 9 are plan and front views of blade outboard sections 48,52 with, e.g., the tip regions made of cellular material 50,54,56. In FIG. 9, a winglet 58 is illustrated with two cellular material segments 54,56 having different characteristics, for example different porosity, density or open cells versus closed cells, for example, for control of material properties.

Figure 10:
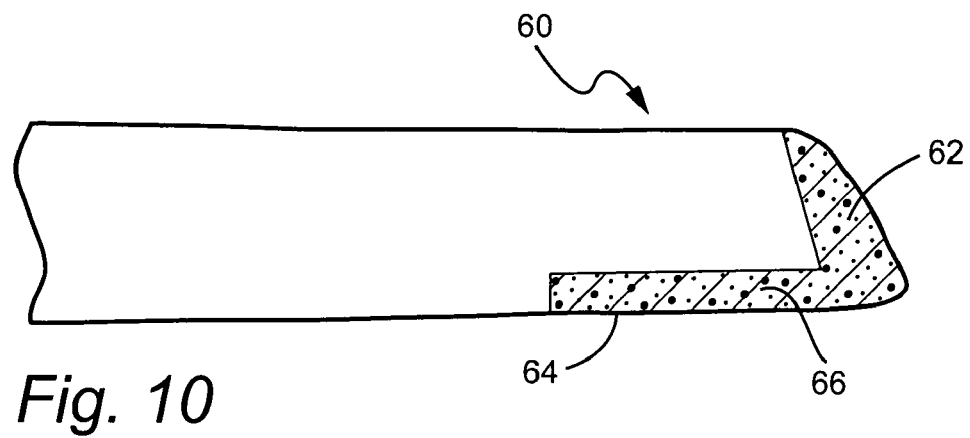
FIG. 10 is a schematic plan view of a wind-turbine blade having a blade tip region with tip and part of the trailing edge made of cellular material according to yet a further example embodiment of the invention.

FIG. 10 illustrates yet a further example embodiment where the blade tip region 60 of the outboard section includes a tip formed of cellular material 62 and a part of the trailing edge 64 is made of cellular material 66. As will be appreciated, the extent of the region formed from cellular material and whether it is provided as a surface layer or to define the structural component in its entirety can be varied to exploit the noise attenuation and dampening characteristics thereof.

Figure 11:
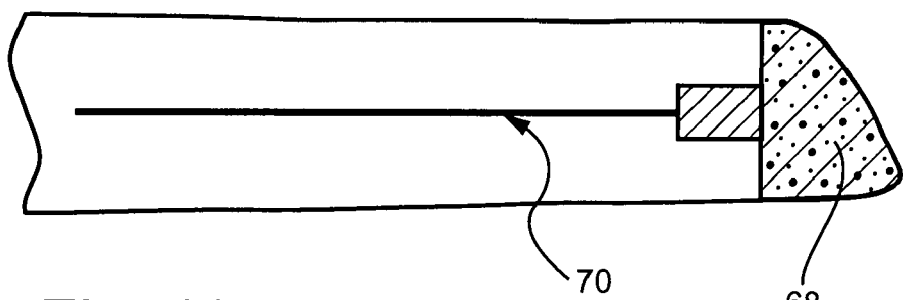
FIG. 11 is a schematic plan view of a wind-turbine blade with metallic foam outboard section or tip region used as part of a blade lightning protection system, according to an example embodiment of the invention.

As understood from the foregoing, in example embodiments of the invention, aerodynamic shapes are formed entirely of cellular material, either metallic, polymeric or other and incorporated on wind turbine components, in particular blades. The cellular material can be used in either part of the wind turbine blade or to comprise the entire blade, part of the airfoil section or an entire airfoil section. In example embodiments, blade tip sections made with cellular materials are provided and designed in shape and structure to act like winglets to reduce tip noise by altering tip vortex creation and evolution. It is to be appreciated that using a metallic foam 68 lends itself to integration with (being operatively coupled to) a lightening-protection system 70 incorporated in the blade, as schematically illustrated in FIG. 11.

In summary, a method of creating low-noise wind turbine blades is provided wherein metallic and/or polymeric (or other) cellular material(s), also referred to herein as foam(s), that are capable of bearing directional loads are used in the construction of wind turbine blade parts or entire sections. The use of such materials in aerodynamic structures is tailored to influence the air flow over them in such a way that a) the boundary-layer turbulence is damped or altered in a controlled way, in order to weaken the noise scattering mechanism at the trailing-edge and b) the scattered acoustic waves are absorbed and attenuated by the materials, acting themselves as acoustic liners. In the case of regions with sharp pressure gradients that give rise to leakage flows, e.g., like a blade tip, the pressure differential between the pressure and suction sides is reduced, resulting in weaker tip-vortex and hence lower tip noise.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A wind turbine blade having a pressure side and a suction side, a leading edge, a trailing edge and a tip region, at least a portion of said blade being formed from a cellular material, said cellular material portion defining a portion of an exposed surface of said blade, whereby aerodynamic noise is reduced via noise source reduction and/or noise attenuation and absorption by the cellular material, wherein said cellular material is provided as a surface layer on at least a portion of the blade, said surface layer being of a predetermined depth.

2. A wind turbine blade as in claim 1, wherein said cellular material comprises a closed cell cellular material.

3. A wind turbine blade as in claim 1, wherein said cellular material is metallic or polymeric or carbon.

4. A wind turbine blade as in claim 1, wherein an aft portion of said blade is formed from a cellular material.

5. A wind turbine blade as in claim 1, wherein said tip region comprises a tip and wherein a part of the trailing edge of the blade and said tip are both made of cellular material.

6. A wind turbine blade as in claim 5, wherein said tip comprises a winglet structure.

7. A wind turbine blade as in claim 6, wherein said winglet structure is formed from a cellular material having material properties differing from a cellular material provided in an adjacent tip region of the blade.

8. A wind turbine blade having a pressure side and a suction side, a leading edge, a trailing edge and a tip region, at least a portion of said blade being formed from a cellular material, said cellular material portion defining a portion of an exposed surface of said blade, whereby aerodynamic noise is reduced via noise source reduction and/or noise attenuation and absorption by the cellular material,
wherein said cellular material comprises an open cell cellular material.

9. A wind turbine blade as in claim 8, wherein said cellular material is metallic or polymeric or carbon.

10. A wind turbine blade as in claim 8, wherein solely an aft portion of said blade is formed from cellular material.

11. A wind turbine blade as in claim 10, wherein said aft portion formed of cellular material comprises a plurality of cellular materials in a chord wise direction, each of said plurality of cellular materials having at least one property differing from an adjacent cellular material.

12. A wind turbine blade as in claim 11, wherein said cellular materials differ in at least one of porosity and open or closed cell characteristic.

13. A wind turbine blade having a pressure side and a suction side, a leading edge, a trailing edge and a tip region, at least a portion of said blade being formed from a cellular material, said cellular material portion defining a portion of an exposed surface of said blade, whereby aerodynamic noise is reduced via noise source reduction and/or noise attenuation and absorption by the cellular material,
wherein an aft portion of said blade is formed from cellular material, and
wherein said cellular material has a plenum defined therein or is connected to a plenum through which the blade's transpiration can be actively controlled by blowing or suction to improve the aerodynamic and aeroacoustic performance of the blade.

14. A wind turbine blade having a pressure side and a suction side, a leading edge, a trailing edge and a tip region, at least a portion of said blade being formed from a cellular material, said cellular material portion defining a portion of an exposed surface of said blade, whereby aerodynamic noise is reduced via noise source reduction and/or noise attenuation and absorption by the cellular material,
wherein at least a portion of said tip region is made of metallic foam and wherein said blade incorporates a lightening protection system operatively coupled to said metallic foam portion.

15. A method of reducing noise in a wind turbine via at least one of noise source reduction and noise attenuation and absorption by a wind turbine blade, the method comprising:
providing a wind turbine blade for the wind turbine, said blade having a pressure side and a suction side, a leading edge, a trailing edge and a tip region;
wherein at least a portion of said blade is formed from a cellular material and wherein said cellular material portion defines a portion of an exposed surface of the blade,
wherein said cellular material is provided as a surface layer on at least a portion of the blade, said surface layer being of a predetermined depth.

16. A method as in claim 15, wherein an aft portion, i.e., from the mid-chord point on any blade section to the trailing edge, is formed from a cellular material.

17. A method as in claim 16, wherein said cellular material has a plenum defined therein or is connected to a plenum through which the blade's transpiration can be actively controlled by blowing or suction to control acoustic attenuation and improve the aerodynamic performance including at least one of reduction of drag, delay of stall, and improvement in lift.

18. A method as in claim 16, wherein said aft portion formed of cellular material comprises a plurality of cellular materials in a chord wise direction, each of said plurality of cellular materials having at least one property differing from an adjacent cellular material.

19. A method as in claim 18, wherein said cellular materials differ in at least one of porosity and open or closed cell characteristic.

20. A method as in claim 15, wherein a part of the trailing edge of the blade and a tip of said tip region are both made of cellular material.

21. A method as in claim 20, wherein said tip comprises a winglet structure.

22. A method as in claim 21, wherein said winglet structure is formed from a cellular material having material properties differing from a cellular material provided in an adjacent tip region of the blade.

* * * * *